US012592489B2

(12) United States Patent
Peng et al.

(10) Patent No.: US 12,592,489 B2
(45) Date of Patent: Mar. 31, 2026

(54) ANTENNA STRUCTURE

(71) Applicant: Wistron NeWeb Corp., Hsinchu (TW)

(72) Inventors: Yen-Tze Peng, Hsinchu (TW); Meng-Kai Wu, Hsinchu (TW); Hong-Jun Jian, Hsinchu (TW); Chia-Hao Chang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 90 days.

(21) Appl. No.: 18/734,096

(22) Filed: Jun. 5, 2024

(65) Prior Publication Data

US 2025/0023244 A1 Jan. 16, 2025

(30) Foreign Application Priority Data

Jul. 11, 2023 (TW) ................................ 112125838

(51) Int. Cl.
*H01Q 9/04* (2006.01)
*H01Q 1/22* (2006.01)
*H01Q 5/371* (2015.01)

(52) U.S. Cl.
CPC ......... *H01Q 9/0421* (2013.01); *H01Q 1/2266* (2013.01); *H01Q 5/371* (2015.01)

(58) Field of Classification Search
CPC .... H01Q 9/0421; H01Q 1/2266; H01Q 5/371; H01Q 1/243; H01Q 9/42
See application file for complete search history.

(56) References Cited

U.S. PATENT DOCUMENTS 6,476,769 B1 * 11/2002 Lehtola .................. H01Q 5/371 343/702
6,909,402 B2 * 6/2005 Vance .................... H01Q 5/371 343/702
10,454,156 B1 * 10/2019 Yang ......................... H01Q 1/48
2004/0041734 A1 * 3/2004 Shiotsu .................... H01Q 9/42 343/702
2004/0108957 A1 * 6/2004 Umehara ............... H01Q 5/385 343/702
2004/0257283 A1 * 12/2004 Asano .................... H01Q 21/28 343/702
2007/0035446 A1 * 2/2007 Pan ........................ H01Q 21/30 343/700 MS (Continued)

*Primary Examiner* — Dameon E Levi
*Assistant Examiner* — Jordan E. DeWitt
(74) *Attorney, Agent, or Firm* — McClure, Qualey & Rodack, LLP

(57) ABSTRACT

An antenna structure includes a ground element, a feeding radiation element, a connection radiation element, a coupling radiation element, a first shorting radiation element, and a second shorting radiation element. The feeding radiation element has a feeding point. The coupling radiation element is coupled through the connection radiation element to the feeding radiation element. The coupling radiation element is also coupled through the first shorting radiation element to a first grounding point on the ground element. The feeding radiation element is also coupled through the second shorting radiation element to a second grounding point on the ground element. A loop structure is formed by the ground element, the connection radiation element, the first shorting radiation element, and the second shorting radiation element.

17 Claims, 7 Drawing Sheets

(56) References Cited

U.S. PATENT DOCUMENTS

| | | | | |
|---|---|---|---|---|
| 2008/0106478 | A1* | 5/2008 | Hill | H01Q 1/38 343/702 |
| 2008/0231531 | A1* | 9/2008 | Wang | H01Q 1/36 343/767 |
| 2009/0179800 | A1* | 7/2009 | Chiu | H01Q 1/2266 343/700 MS |
| 2011/0199272 | A1* | 8/2011 | He | H01Q 1/38 343/741 |
| 2011/0260938 | A1* | 10/2011 | Xie | H01Q 5/321 343/722 |
| 2013/0076587 | A1* | 3/2013 | Wong | H01Q 1/48 343/848 |
| 2013/0234903 | A1* | 9/2013 | Kwak | H01Q 1/243 343/750 |
| 2014/0104134 | A1* | 4/2014 | Chen | H01Q 9/145 343/876 |
| 2014/0118204 | A1* | 5/2014 | Gavilan | H01Q 9/42 343/745 |
| 2014/0320349 | A1* | 10/2014 | Lee | H01Q 1/243 343/700 MS |
| 2019/0027810 | A1* | 1/2019 | Li | H01Q 5/328 |
| 2019/0027811 | A1* | 1/2019 | Chen | H01Q 13/10 |
| 2020/0091595 | A1* | 3/2020 | Lee | H01Q 1/22 |
| 2020/0185813 | A1* | 6/2020 | Chang | H01Q 1/48 |
| 2020/0274230 | A1* | 8/2020 | Wei | H01Q 5/357 |
| 2020/0274231 | A1* | 8/2020 | Wei | H01Q 5/364 |
| 2021/0044000 | A1* | 2/2021 | Chang | H01Q 1/38 |
| 2021/0249776 | A1* | 8/2021 | Wei | H01Q 5/328 |
| 2021/0336339 | A1* | 10/2021 | Lee | H01Q 13/16 |
| 2022/0069473 | A1* | 3/2022 | Lai | H01Q 5/357 |
| 2023/0198149 | A1* | 6/2023 | Wei | H01Q 5/364 343/702 |
| 2023/0387591 | A1* | 11/2023 | Chang | H01Q 13/16 |
| 2023/0411837 | A1* | 12/2023 | Wu | H01Q 1/36 |
| 2024/0030615 | A1* | 1/2024 | Cheng | H01Q 5/378 |
| 2024/0047864 | A1* | 2/2024 | Chen | H01Q 5/385 |
| 2024/0088562 | A1* | 3/2024 | Su | H01Q 5/328 |
| 2024/0162618 | A1* | 5/2024 | Chang | H01Q 5/314 |
| 2024/0170844 | A1* | 5/2024 | Chang | H01Q 9/0421 |
| 2024/0178561 | A1* | 5/2024 | Chang | H01Q 1/2266 |
| 2024/0195082 | A1* | 6/2024 | Lo | H01Q 5/378 |
| 2025/0023244 | A1* | 1/2025 | Peng | H01Q 9/0421 |
| 2025/0046996 | A1* | 2/2025 | Su | H01Q 5/50 |
| 2025/0062534 | A1* | 2/2025 | Wang | H01Q 1/2291 |

* cited by examiner

ANTENNA STRUCTURE

CROSS REFERENCE TO RELATED APPLICATIONS

This application claims priority of Taiwan Patent Application No. 112125838 filed on Jul. 11, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a feeding radiation element, a connection radiation element, a coupling radiation element, a first shorting radiation element, and a second shorting radiation element. The feeding radiation element has a feeding point. The coupling radiation element is coupled through the connection radiation element to the feeding radiation element. The coupling radiation element is also coupled through the first shorting radiation element to a first grounding point on the ground element. The feeding radiation element is also coupled through the second shorting radiation element to a second grounding point on the ground element. A loop structure is formed by the ground element, the connection radiation element, the first shorting radiation element, and the second shorting radiation element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
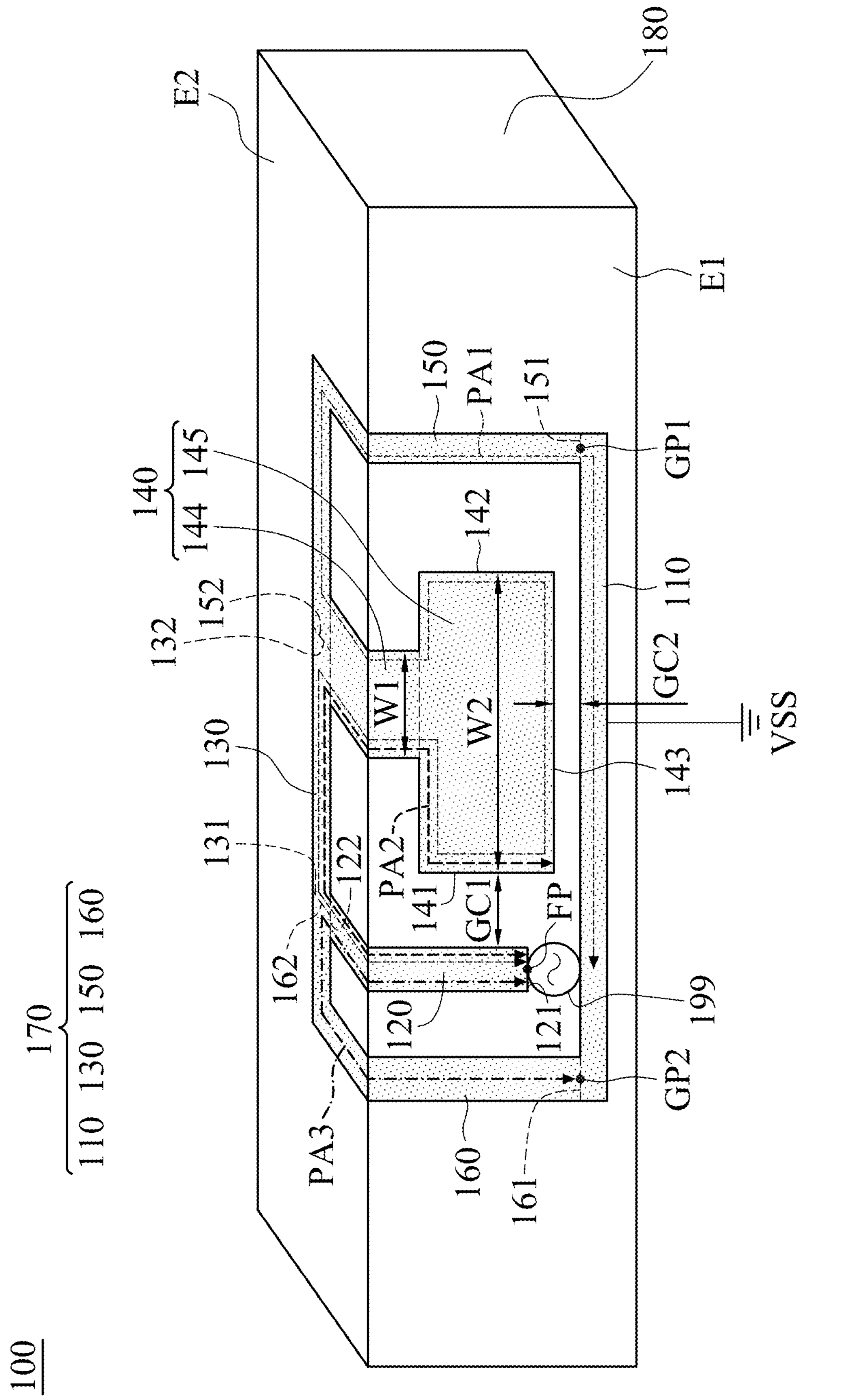
FIG. 1 is a perspective view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view of an antenna structure 100 according to an embodiment of the invention. The antenna structure 100 may be applied to a mobile device, such as a smart phone, a tablet computer, or a notebook computer. In the embodiment of FIG. 1, the antenna structure 100 at least includes a ground element 110, a feeding radiation element 120, a connection radiation element 130, a coupling radiation element 140, a first shorting radiation element 150, and a second shorting radiation element 160. The ground element 110, the feeding radiation element 120, the connection radiation element 130, the coupling radiation element 140, the first shorting radiation element 150, and the second shorting radiation element 160 may all be made of metal materials, such as copper, silver, aluminum, iron, or their alloys.

The ground element 110 may be implemented with a ground copper foil. In some embodiments, the ground element 110 may be further coupled to a ground voltage VSS, which may be provided by a system ground plane (not shown) of the antenna structure 100.

The feeding radiation element 120 has a first end 121 and a second end 122. A feeding point FP is positioned at the first end 121 of the feeding radiation element 120. The feeding point FP may be further coupled to a positive electrode of a signal source 199. A negative electrode of the signal source 199 may be coupled to the ground element 110. For example, the signal source 199 may be an RF (Radio Frequency) module for exciting the antenna structure 100. In some embodiments, the feeding radiation element 120 substantially has a straight-line shape, but it is not limited thereto.

The connection radiation element 130 and the feeding radiation element 120 may be substantially perpendicular to each other, but they are not limited thereto. Specifically, the connection radiation element 130 has a first end 131 and a second end 132. The first end 131 of the connection radiation element 130 is coupled to the second end 122 of the feeding radiation element 120. In some embodiments, the connection radiation element 130 substantially has another straight-line shape, but it is not limited to.

The coupling radiation element 140 has a first edge 141, a second edge 142, and a third edge 143. The first edge 141 and the second edge 142 may be opposite to each other. The third edge 143 may be positioned between the first edge 141 and the second edge 142. Specifically, the coupling radiation element 140 includes a narrow portion 144 and a wide portion 145. The wide portion 145 is coupled through the narrow portion 144 to the second end 132 of the connection radiation element 130. That is, the coupling radiation element 140 is coupled through the connection radiation element 130 to the feeding radiation element 120. In some embodiments, the coupling radiation element 140 substantially has an inverted T-shape, but it is not limited thereto.

Furthermore, the coupling radiation element 140 is adjacent to the feeding radiation element 120. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0). In some embodiments, a first coupling gap GC1 is formed between the feeding radiation element 120 and the first edge 141 of the coupling radiation element 140, and a second coupling gap GC2 is formed between the ground element 110 and the third edge 143 of the coupling radiation element 140. However, the invention is not limited thereto. In alternative embodiments, the positions of the feeding radiation element 120 and the coupling radiation element 140 are exchanged with each other, such that another first coupling gap GC1 is formed between the feeding radiation element 120 and the second edge 142 of the coupling radiation element 140.

The first shorting radiation element 150 has a first end 151 and a second end 152. The first end 151 of the first shorting radiation element 150 is coupled to a first grounding point GP1 on the ground element 110. The second end 152 of the first shorting radiation element 150 is coupled to the second end 132 of the connection radiation element 130 and the narrow portion 144 of the coupling radiation element 140. That is, both the connection radiation element 130 and the coupling radiation element 140 are coupled through the first shorting radiation element 150 to the ground element 110. In some embodiments, the first shorting radiation element 150 substantially has an L-shape, but it is not limited thereto.

The second shorting radiation element 160 has a first end 161 and a second end 162. The first end 161 of the second shorting radiation element 160 is coupled to a second grounding point GP2 on the ground element 110. The second end 162 of the second shorting radiation element 160 is coupled to the second end 122 of the feeding radiation element 120 and the first end 131 of the connection radiation element 130. That is, both the feeding radiation element 120 and the connection radiation element 130 are coupled through the second shorting radiation element 160 to the ground element 110. In some embodiments, the second grounding point GP2 is different from the aforementioned first grounding point GP1. For example, the first grounding point GP1 and the second grounding point GP2 may be positioned at two ends of the ground element 110, respectively, but they are not limited thereto. In some embodiments, the second shorting radiation element 160 substantially has another L-shape, but it is not limited thereto.

It should be noted that a completely closed loop structure 170 is formed by the ground element 110, the connection radiation element 130, the first shorting radiation element 150, and the second shorting radiation element 160. The feeding radiation element 120 and the coupling radiation element 140 are surrounded by the loop structure 170. For example, if the loop structure 170 substantially has a hollow rectangular shape, both the feeding radiation element 120 and the coupling radiation element 140 can be positioned inside the hollow rectangular shape, but they may not be limited thereto.

In some embodiments, the antenna structure 100 further includes a nonconductive support element 180. The ground element 110, the feeding radiation element 120, the connection radiation element 130, the coupling radiation element 140, the first shorting radiation element 150, and the second shorting radiation element 160 are all disposed on the nonconductive support element 180. Specifically, the nonconductive support element 180 has a first surface E1 and a second surface E2 which are perpendicular to each other. The ground element 110, the feeding radiation element 120, the connection radiation element 130, the coupling radiation element 140, the first shorting radiation element 150, and the second shorting radiation element 160 are distributed over the first surface E1 and the second surface E2 of the nonconductive support element 180. For example, except for the ground element 110 disposed on the first surface E1 and the connection radiation element 130 disposed on the second surface E2, all of the feeding radiation element 120, the coupling radiation element 140, the first shorting radiation element 150, and the second shorting radiation element 160 can extend from the first surface E1 to the second surface E2. However, the invention is not limited thereto. In alternative embodiments, the nonconductive support element 180 is implemented with a PCB (Printed Circuit Board), such that the antenna structure 100 becomes a planar antenna structure, without affecting its practical radiation performance.

Figure 2:
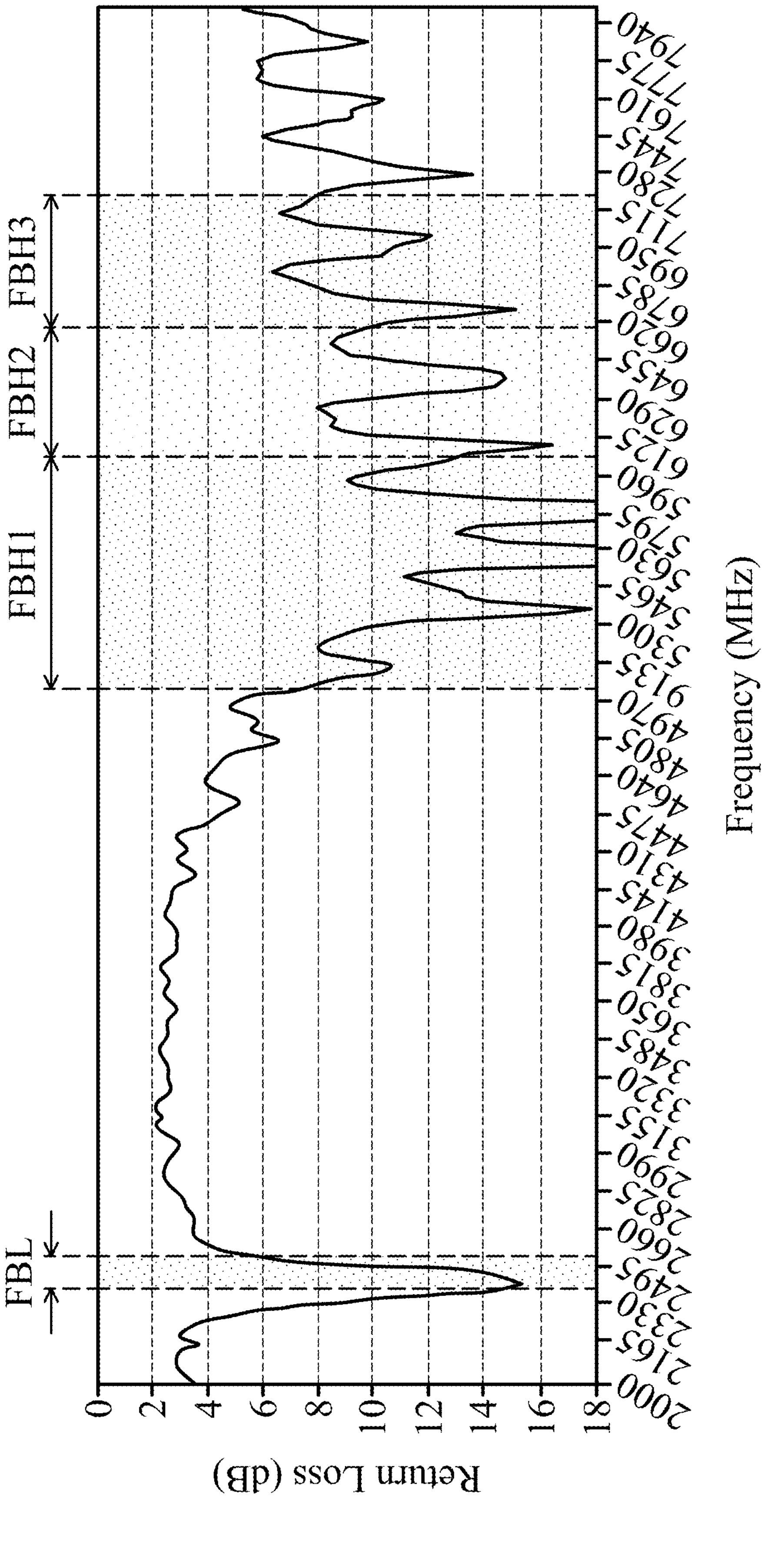
FIG. 2 is a diagram of return loss of an antenna structure according to an embodiment of the invention.

FIG. 2 is a diagram of return loss of the antenna structure 100 according to an embodiment of the invention. The horizontal axis represents the operational frequency (MHz), and the vertical axis represents the return loss (dB). According to the measurement of FIG. 2, the antenna structure 100 can cover a low-frequency band FBL, a first high-frequency band FBH1, a second high-frequency band FBH2, and a third high-frequency band FBH3. For example, the low-frequency band FBL may be from 2400 MHz to 2500 MHz, the first high-frequency band FBH1 may be from 5100 MHz to 6000 MHz, the second high-frequency band FBH2 may be from 6000 MHz to 6600 MHz, and the third high-frequency band FBH3 may be from 6600 MHz to 7125 MHz. Therefore, the antenna structure 100 can support at least the wideband operations of conventional WLAN (Wireless Local Area Network) and next-generation Wi-Fi 6E.

In some embodiments, the operational principles of the antenna structure 100 are described as follows. A first resonant path PA1 can be formed along the feeding radiation element 120, the connection radiation element 130, the first edge 141, the third edge 143 and the second edge 142 of the coupling radiation element 140, the first shorting radiation element 150, and the ground element 110. The first resonant path PA1 can be excited to generate the low-frequency band FBL and the second high-frequency band FBH2. Also, a second resonant path PA2 can be formed along the feeding radiation element 120, the connection radiation element 130, and the first edge 141 of the coupling radiation element 140. The second resonant path PA2 can be excited to generate the first high-frequency band FBH1. In the coupling radiation element 140, the length of the first resonant path PA1 and the length of the second resonant path PA2 can be adjusted by changing the width W1 of the narrow portion 144 and the width W2 of the wide portion 145. Variations in the width W1 of the narrow portion 144 can affect the feeding matching of the antenna structure 100. Variations in the width W2 of the wide portion 145 can affect the width of the first coupling gap GC1 and the width of the second coupling gap GC2. Furthermore, a third resonant path PA3 can be formed along the feeding radiation element 120 and the second shorting radiation element 160. The third resonant path PA3 can be excited to generate the third high-frequency band FBH3. According to practical measurements, the first coupling gap GC1 and the second coupling gap GC2 are used to fine-tune the impedance matching of the low-frequency band FBL, the first high-frequency band FBH1, the second high-frequency band FBH2, and the third high-frequency band FBH3 as mentioned above, thereby increasing their operational bandwidths.

In some embodiments, the element sizes of the antenna structure 100 are described as follows. The length of the first resonant path PA1 may be substantially equal to 0.5 wavelength (λ/2) of the low-frequency band FBL of the antenna structure 100. The length of the second resonant path PA2 may be substantially equal to 0.5 wavelength (λ/2) of the first high-frequency band FBH1 of the antenna structure 100. The length of the third resonant path PA3 may be substantially equal to 0.5 wavelength (λ/2) of the third high-frequency band FBH3 of the antenna structure 100. In the coupling radiation element 140, the width W1 of the narrow portion 144 may be from 2 mm to 6 mm, and the width W2 of the wide portion 145 may be from 9 mm to 13 mm. The width of the first coupling gap GC1 may be greater than or equal to the width of the second coupling gap GC2. For example, the width of the first coupling gap GC1 may be from 0.05 mm to 4 mm, and the width of the second coupling gap GC2 may be from 0.05 mm to 3 mm. The above ranges of element sizes are calculated and obtained according to many experiment results, and they help to optimize the operational bandwidth and impedance matching of the antenna structure 100.

The following embodiments will introduce different configurations and detailed structural features of the antenna structure 100. It should be understood that these figures and descriptions are merely exemplary, rather than limitations of the invention.

Figure 3:
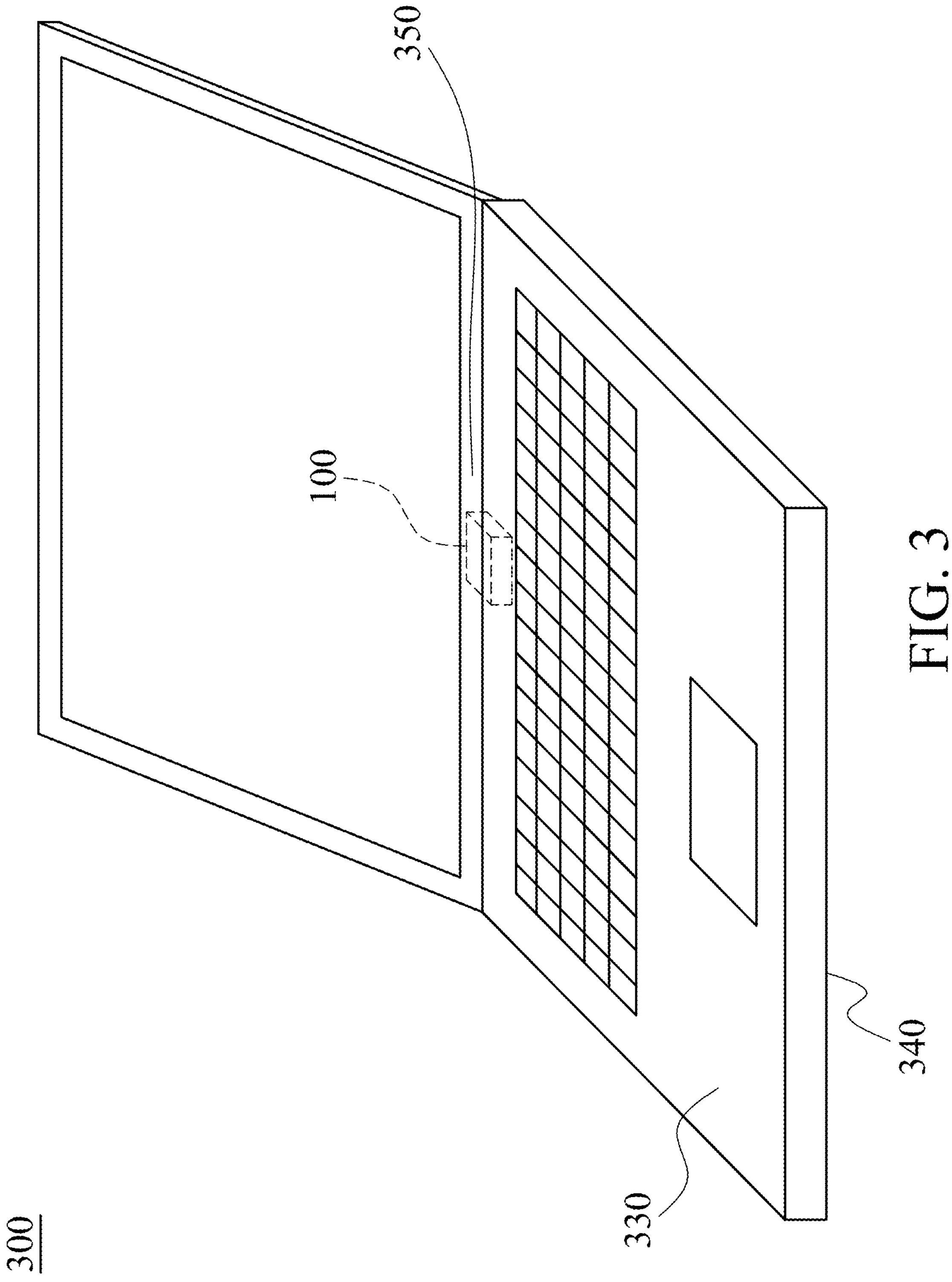
FIG. 3 is a perspective view of a notebook computer according to an embodiment of the invention.

FIG. 3 is a perspective view of a notebook computer 300 according to an embodiment of the invention. In the embodiment of FIG. 3, the aforementioned antenna structure 100 is applied in the notebook computer 300. The notebook computer 300 at least includes a keyboard frame 330, a base housing 340, and a hinge element 350. It should be understood that the keyboard frame 330 and the base housing 340 are respectively equivalent to the so-called "C-component" and "D-component" in the field of notebook computers. Specifically, the aforementioned antenna structure 100 may be disposed between the keyboard frame 330 and the base housing 340, and may also be adjacent to the hinge element 350. With this design, even if the keyboard frame 330 and the base housing 340 are made of metal, the main radiation direction of the antenna structure 100 can be arranged toward the hinge element 350, so that the antenna structure 100 can provide sufficient radiation gain. In addition, the 3D (Three-Dimensional) design of the nonconductive support element 180 can make the antenna structure 100 correspond to different shapes of the hinge element 350.

Figure 4:
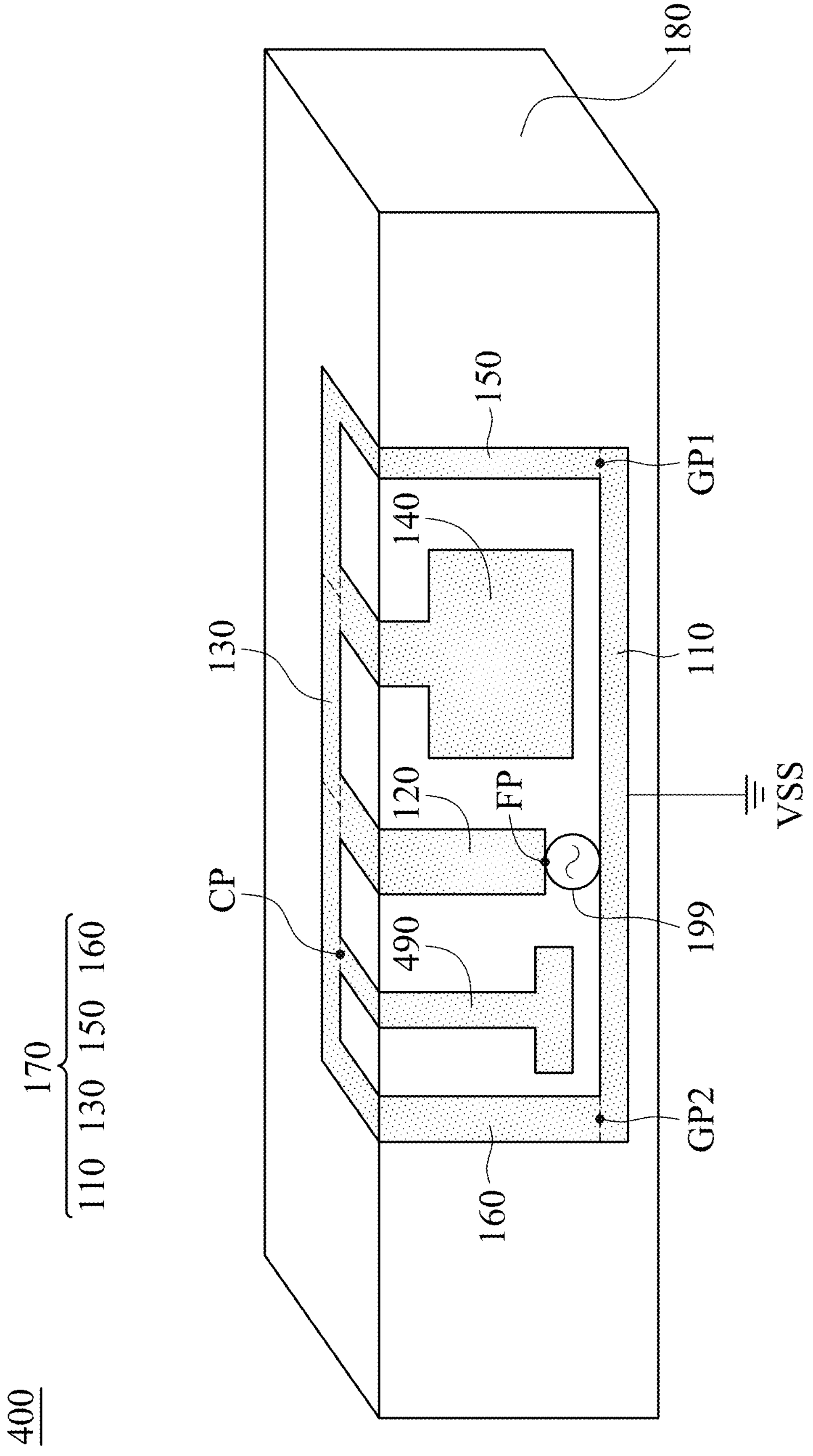
FIG. 4 is a perspective view of an antenna structure according to an embodiment of the invention.

FIG. 4 is a perspective view of an antenna structure 400 according to an embodiment of the invention. FIG. 4 is similar to FIG. 1. In the embodiment of FIG. 4, the aforementioned coupling radiation element 140 is considered as a first coupling radiation element, and the antenna structure 400 further includes a second coupling radiation element 490. The second coupling radiation element 490 can also be surrounded by the loop structure 170. For example, the second coupling radiation element 490 may substantially have another relatively small inverted T-shape, which may be coupled to a connection point CP on the second shorting radiation element 160. It should be noted that the aforementioned feeding radiation element 120 is disposed between the first coupling radiation element 140 and the second coupling radiation element 490. According to practical measurements, the incorporation of the second coupling radiation element 490 can help to increase the operational bandwidth of the antenna structure 400 (especially for the bandwidths of the first high-frequency band FBH1, the second high-frequency band FBH2, and the third high-frequency band FBH3). Other features of the antenna structure 400 of FIG. 4 are similar to those of the antenna structure 100 of FIG. 1. Therefore, the two embodiments can achieve similar levels of performance.

Figure 5:
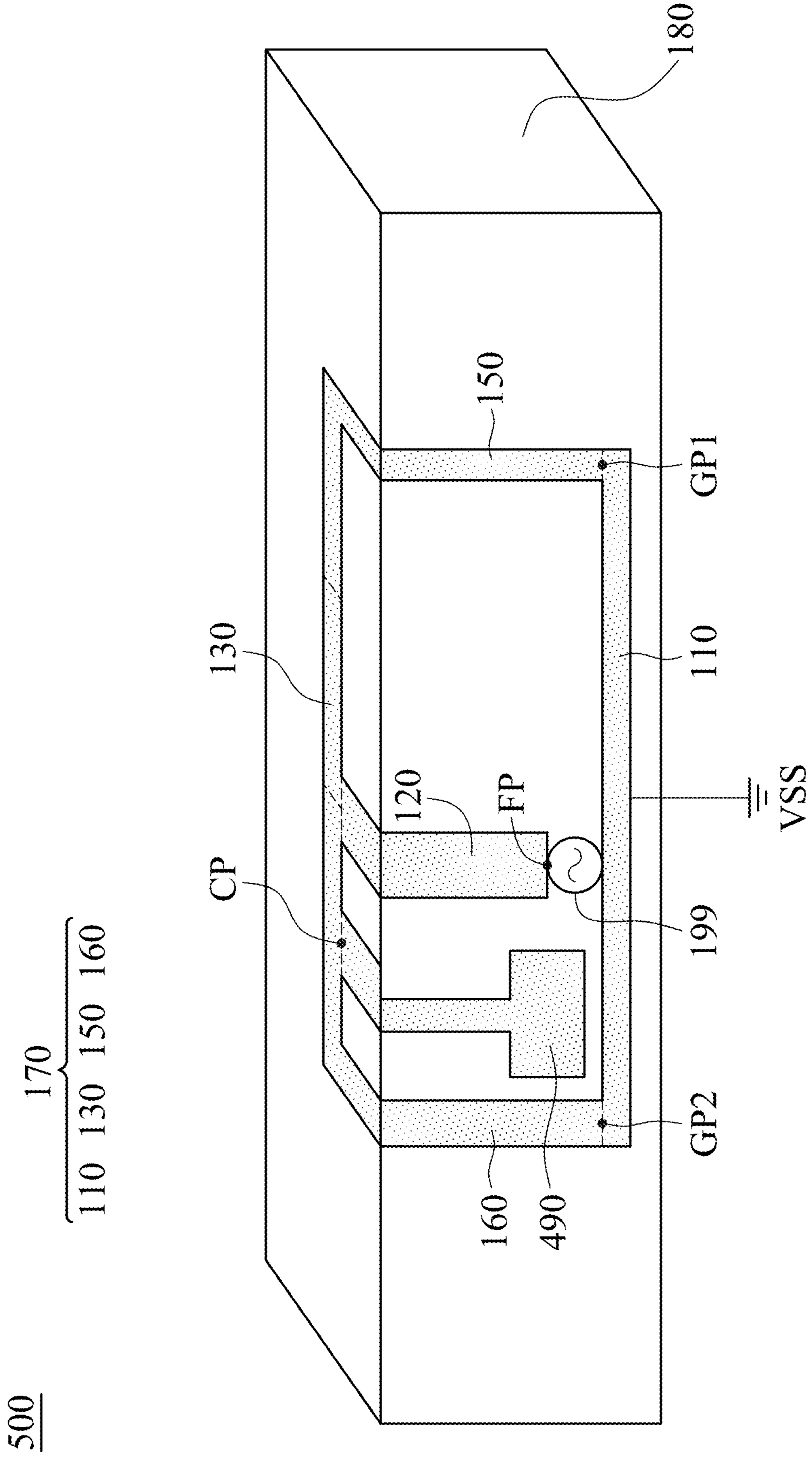
FIG. 5 is a perspective view of an antenna structure according to an embodiment of the invention.

FIG. 5 is a perspective view of an antenna structure 500 according to an embodiment of the invention. FIG. 5 is similar to FIG. 4. In the embodiment of FIG. 5, the antenna structure 500 includes the second coupling radiation element 490, but does not include the first coupling radiation element 140. According to practical measurements, the incorporation of the second coupling radiation element 490 can divide the first high-frequency band FBH1, the second high-frequency band FBH2, and the third high-frequency band FBH3 of the antenna structure 500 into more sub-frequency bands, so as to perform a respective adjustment of impedance matching for each sub-frequency band. Other features of the antenna structure 500 of FIG. 5 are similar to those of the antenna structure 400 of FIG. 4. Therefore, the two embodiments can achieve similar levels of performance.

Figure 6:
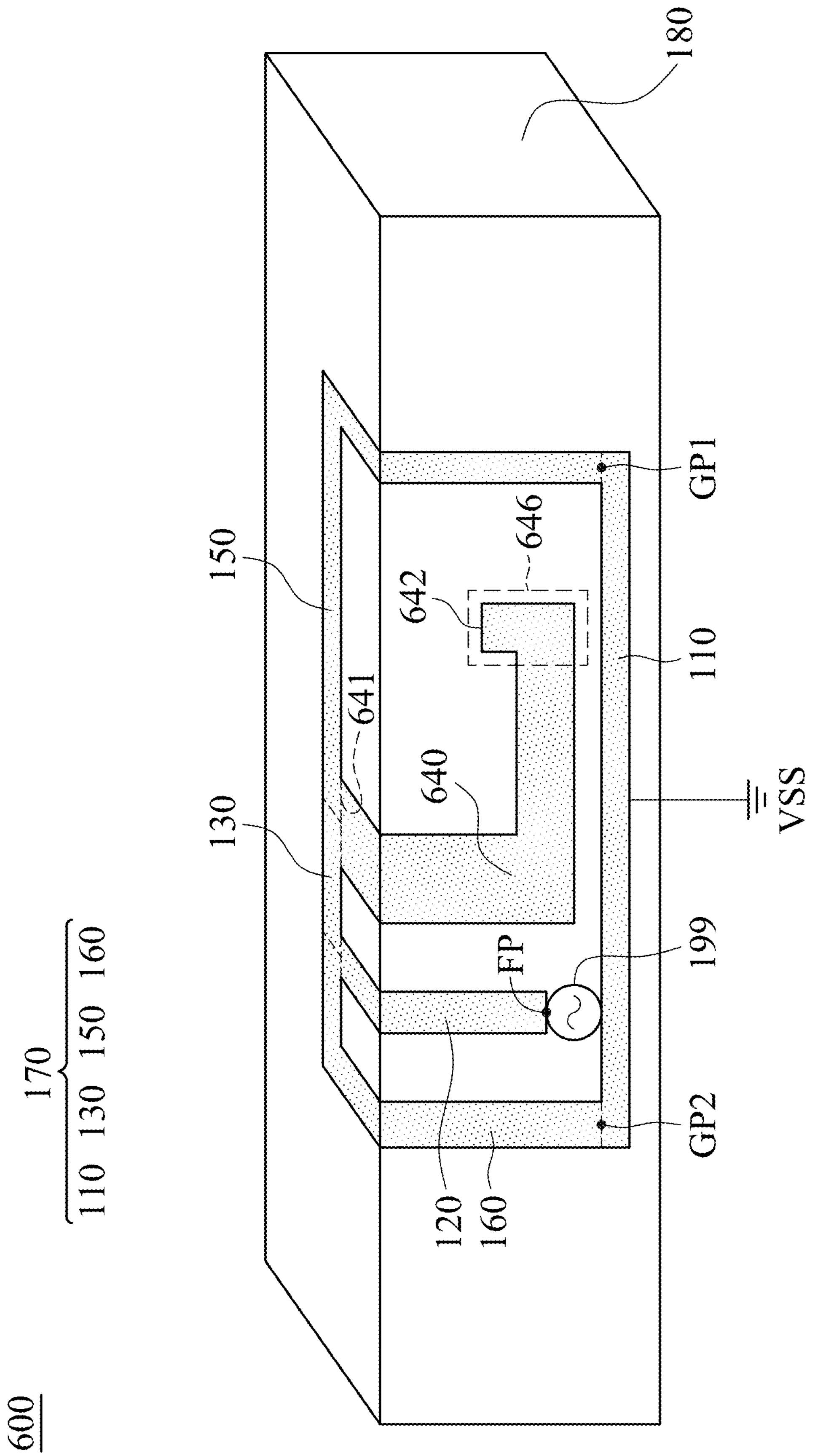
FIG. 6 is a perspective view of an antenna structure according to an embodiment of the invention.

FIG. 6 is a perspective view of an antenna structure 600 according to an embodiment of the invention. FIG. 6 is similar to FIG. 1. In the embodiment of FIG. 6, a coupling radiation element 640 of the antenna structure 600 substantially has an L-shape. Specifically, the coupling radiation element 640 has a first end 641 and a second end 642. The first end 641 of the coupling radiation element 640 is coupled to the connection radiation element 130 and the first shorting radiation element 150. The second end 642 of the coupling radiation element 640 is an open end. In addition, the coupling radiation element 640 further includes a terminal bending portion 646, such that the second end 642 of the coupling radiation element 640 extends away from the ground element 110. According to practical measurements, the coupling radiation element 640 having an L-shape is configured to adjust the high-frequency shift of the antenna structure 600 since the length of the second resonant path corresponding to the first high-frequency band FBH1 of the antenna structure 600 becomes shorter. Also, the first high-frequency band FBH1 may become higher. Other features of the antenna structure 600 of FIG. 6 are similar to those of the antenna structure 100 of FIG. 1. Therefore, the two embodiments can achieve similar levels of performance.

Figure 7:
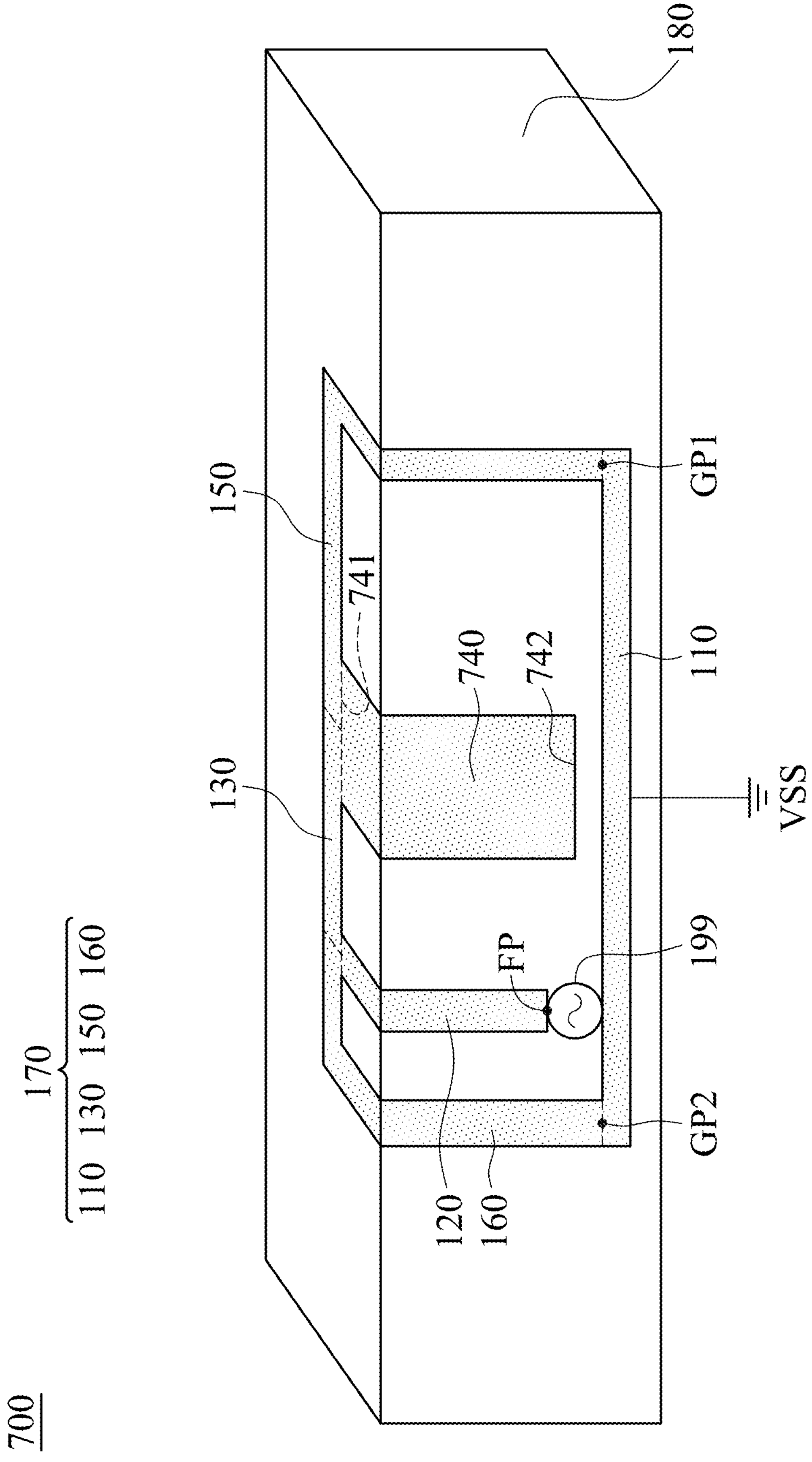
FIG. 7 is a perspective view of an antenna structure according to an embodiment of the invention.

FIG. 7 is a perspective view of an antenna structure 700 according to an embodiment of the invention. FIG. 7 is similar to FIG. 1. In the embodiment of FIG. 7, a coupling radiation element 740 of the antenna structure 700 substantially has an I-shape. Specifically, the coupling radiation element 740 has a first end 741 and a second end 742. The first end 741 of the coupling radiation element 740 is coupled to the connection radiation element 130 and the first shorting radiation element 150. The second end 742 of the coupling radiation element 740 is an open end, which may extend toward the ground element 110. According to practical measurements, the coupling radiation element 740 having an I-shape is configured to enhance the radiation gain of the antenna structure 700. Other features of the antenna structure 700 of FIG. 7 are similar to those of the antenna structure 100 of FIG. 1. Therefore, the two embodiments can achieve similar levels of performance.

It should be understood that in the embodiments of FIGS. 4, 5, 6 and 7, the practical shape of each radiation element can be slightly adjusted for better radiation performance and a variety of design purposes.

The invention proposes a novel antenna structure, which includes at least one loop structure. In comparison to the conventional design, the invention has at least the advantages of small size, wide bandwidth, low manufacturing cost, and being used in different environments. Therefore, the invention is suitable for application in a variety of mobile communication devices.

Note that the above element sizes, element shapes, and frequency ranges are not limitations of the invention. An antenna designer can fine-tune these settings or values in order to meet specific requirements. It should be understood that the antenna structure of the invention is not limited to the configurations depicted in FIGS. 1-7. The invention may merely include any one or more features of any one or more embodiments of FIGS. 1-7. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a feeding radiation element, having a feeding point;

a connection radiation element;

a coupling radiation element, coupled through the connection radiation element to the feeding radiation element;

a first shorting radiation element, wherein the coupling radiation element is coupled through the first shorting radiation element to a first grounding point on the ground element; and a second shorting radiation element, wherein the feeding radiation element is coupled through the second shorting radiation element to a second grounding point on the ground element;

wherein a loop structure is formed by the ground element, the connection radiation element, the first shorting radiation element, and the second shorting radiation element;

wherein the coupling radiation element has a first edge, a second edge, and a third edge, and wherein the third edge is positioned between the first edge and the second edge;

wherein the antenna structure covers a low-frequency band, a first high-frequency band, a second high-frequency band, and a third high-frequency band;

wherein a first resonant path is formed along the feeding radiation element, the connection radiation element, the first edge, the third edge and the second edge of the coupling radiation element, the first shorting radiation element, and the ground element, and wherein the first resonant path is excited to generate the low-frequency band and the second high-frequency band.

2. The antenna structure as claimed in claim 1, wherein the coupling radiation element comprises a narrow portion and a wide portion, and wherein the wide portion is coupled through the narrow portion to the connection radiation element and the first shorting radiation element.

3. The antenna structure as claimed in claim 1, wherein the coupling radiation element substantially has an inverted T-shape, an L-shape, or an I-shape.

4. The antenna structure as claimed in claim 1, wherein a first coupling gap is formed between the feeding radiation element and the first edge or the second edge of the coupling radiation element.

5. The antenna structure as claimed in claim 4, wherein a width of the first coupling gap is from 0.05 mm to 4 mm.

6. The antenna structure as claimed in claim 1, wherein a second coupling gap is formed between the ground element and the third edge of the coupling radiation element.

7. The antenna structure as claimed in claim 6, wherein a width of the second coupling gap is from 0.05 mm to 3 mm.

8. The antenna structure as claimed in claim 1, wherein the feeding radiation element and the coupling radiation element are surrounded by the loop structure.

9. The antenna structure as claimed in claim 1, further comprising:

a nonconductive support element, wherein the ground element, the feeding radiation element, the connection radiation element, the coupling radiation element, the first shorting radiation element, and the second shorting radiation element are disposed on the nonconductive support element.

10. The antenna structure as claimed in claim 9, wherein the nonconductive support element has a first surface and a second surface perpendicular to each other, and wherein the ground element, the feeding radiation element, the connection radiation element, the coupling radiation element, the first shorting radiation element, and the second shorting radiation element are distributed over the first surface and the second surface.

11. The antenna structure as claimed in claim 1, wherein the coupling radiation element is a first coupling radiation element, and the antenna structure further comprises:

a second coupling radiation element, coupled to a connection point on the second shorting radiation element, wherein the feeding radiation element is disposed between the first coupling radiation element and the second coupling radiation element.

12. The antenna structure as claimed in claim 1, wherein the low-frequency band is from 2400 MHz to 2500 MHz, the first high-frequency band is from 5100 MHz to 6000 MHz, the second high-frequency band is from 6000 MHz to 6600 MHz, and the third high-frequency band is from 6600 MHz to 7125 MHz.

13. The antenna structure as claimed in claim 1, wherein a length of the first resonant path is substantially equal to 0.5 wavelength of the low-frequency band.

14. The antenna structure as claimed in claim 1, wherein a second resonant path is formed along the feeding radiation element, the connection radiation element, and the first edge of the coupling radiation element, and wherein the second resonant path is excited to generate the first high-frequency band.

15. The antenna structure as claimed in claim 14, wherein a length of the second resonant path is substantially equal to 0.5 wavelength of the first high-frequency band.

16. The antenna structure as claimed in claim 1, wherein a third resonant path is formed along the feeding radiation element and the second shorting radiation element, and wherein the third resonant path is excited to generate the third high-frequency band.

17. The antenna structure as claimed in claim 16, wherein a length of the third resonant path is substantially equal to 0.5 wavelength of the third high-frequency band.

* * * * *